(12) United States Patent
Lim et al.

(10) Patent No.: US 10,567,978 B2
(45) Date of Patent: Feb. 18, 2020

(54) METHOD AND APPARATUS FOR SETTING INITIAL WINDOW VALUE IN WIRELESS COMMUNICATION SYSTEM

(71) Applicant: Samsung Electronics Co., Ltd., Suwon-si, Gyeonggi-do (KR)

(72) Inventors: Han-Na Lim, Seongnam-si (KR); Hyung-Ho Lee, Seoul (KR); Jung-Shin Park, Seoul (KR); Joo-Hyung Lee, Bucheon-si (KR); Jin-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/574,032

(22) PCT Filed: May 13, 2016

(86) PCT No.: PCT/KR2016/005100
§ 371 (c)(1),
(2) Date: Nov. 14, 2017

(87) PCT Pub. No.: WO2016/186396
PCT Pub. Date: Nov. 24, 2016

(65) Prior Publication Data
US 2018/0302805 A1 Oct. 18, 2018

(30) Foreign Application Priority Data

May 15, 2015 (KR) .................. 10-2015-0068336

(51) Int. Cl.
*H04W 24/02* (2009.01)
*H04W 28/02* (2009.01)
*H04W 80/06* (2009.01)
*H04W 88/18* (2009.01)
(Continued)

(52) U.S. Cl.
CPC ......... *H04W 24/02* (2013.01); *H04L 43/0864* (2013.01); *H04L 43/0888* (2013.01);
(Continued)

(58) Field of Classification Search
CPC ... H04W 24/02; H04W 88/182; H04W 24/08; H04W 84/042; H04W 80/06; H04L 43/0864; H04L 43/0888
See application file for complete search history.

(56) References Cited

U.S. PATENT DOCUMENTS 7,701,853 B2 4/2010 Malhotra et al.
8,639,835 B2 1/2014 Kotecha et al.
(Continued)

*Primary Examiner* — Sai Aung
*Assistant Examiner* — Liem H. Nguyen
(74) *Attorney, Agent, or Firm* — Jefferson IP Law, LLP

(57) ABSTRACT

The present disclosure relates to a 5G or pre-5G communication system to be provided for supporting a data transmission rate higher than that of a 4G communication system such as an LTE. The present invention relates to a method by which a proxy sets an initial window value in a wireless communication system, the method comprising: splitting a transmission control protocol (TCP) connection between a terminal and a server; extracting the information related to the terminal from the data received from the terminal; and setting the initial window value on the basis of a round trip time (RTT) value and a throughput value for each of terminal groups grouped on the basis of the information related to the terminal.

14 Claims, 8 Drawing Sheets

(51) Int. Cl.

| | | |
|---|---|---|
| *H04W 84/04* | (2009.01) | |
| *H04W 24/08* | (2009.01) | |
| *H04L 12/841* | (2013.01) | |
| *H04L 12/893* | (2013.01) | |
| *H04L 12/801* | (2013.01) | |
| *H04L 12/26* | (2006.01) | |
| *H04L 29/06* | (2006.01) | |

(52) U.S. Cl.
CPC .......... *H04L 47/193* (2013.01); *H04L 47/283* (2013.01); *H04L 47/40* (2013.01); *H04W 28/0236* (2013.01); *H04W 28/0247* (2013.01); *H04W 80/06* (2013.01); *H04L 69/163* (2013.01); *H04W 24/08* (2013.01); *H04W 84/042* (2013.01); *H04W 88/182* (2013.01)

(56) References Cited

U.S. PATENT DOCUMENTS

| | | |
|---|---|---|
| 9,094,998 B2 | 7/2015 | Cheng |
| 2006/0031571 A1 | 2/2006 | Banerjee et al. |
| 2007/0076621 A1* | 4/2007 | Malhotra ................. H04L 47/10 370/252 |
| 2010/0177717 A1* | 7/2010 | Sung .................... H04W 72/042 370/329 |
| 2011/0194490 A1 | 8/2011 | Gandham et al. |
| 2012/0137019 A1* | 5/2012 | Kotecha ............ H04W 28/0273 709/233 |
| 2014/0036674 A1 | 2/2014 | Agrawal et al. |
| 2014/0098679 A1* | 4/2014 | Baillargeon ............ H04L 43/08 370/251 |
| 2014/0281018 A1 | 9/2014 | Waclawsky et al. |
| 2014/0286164 A1* | 9/2014 | Mahindra ................ H04L 47/19 370/235 |
| 2014/0286258 A1* | 9/2014 | Chowdhury .......... H04L 1/1812 370/329 |
| 2015/0365483 A1* | 12/2015 | Xiong ..................... H04L 29/06 709/203 |
| 2016/0183208 A1* | 6/2016 | Lee ........................ H04W 76/14 370/350 |
| 2016/0227416 A1* | 8/2016 | Suzuki ............. H04W 72/0453 |
| 2017/0223148 A1* | 8/2017 | Roeland .................. H04L 12/66 |

* cited by examiner

METHOD AND APPARATUS FOR SETTING INITIAL WINDOW VALUE IN WIRELESS COMMUNICATION SYSTEM

PRIORITY

This application is a National Phase Entry of PCT International Application No. PCT/KR2016/005100, which was filed on May 13, 2016, and claims a priority to Korean Patent Application No. 10-2015-0068336, which was filed on May 15, 2015, the contents of which are incorporated herein by reference.

TECHNICAL FIELD

The present disclosure relates to a method and apparatus for setting an initial window value in a wireless communication system.

BACKGROUND ART

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Meanwhile, most Internet services use, as a transmission protocol, a transmission control protocol (TCP) which is an end-to-end protocol and performs window-based transmission control for data transmission. That is, a TCP sender may transmit data corresponding to a size of a window to a TCP receiver, and in particular, the amount of data transmitted to the receiver by the sender after TCP session setup is based on a size of an initial window.

Since the TCP has been designed for use in a low-speed wired network having a frequent packet drop, the TCP sender transmits a small amount of data in initial transmission to prevent a packet drop, and thereafter, a window size is increased to transmit a larger amount of data only in a good network state. The network state may be determined, for example, based on whether an ACK packet is received from the receiver in response to data transmitted by the sender. A current TCP sender, e.g., an Internet server mostly uses 4 KB as an initial window value, and even in a radical setting case, the initial window size is only 10 KB.

However, a wireless cellular network such as LTE has a lower packet drop probability and a much better transmission network quality than a wired network. Thus, even if a user equipment (UE) in an LTE network has an available high air throughput, the TCP sender uses a very small initial window that is set arbitrarily because of not knowing a radio channel state, resulting in initial transmission delay. In this way, larger performance degradation occurs for higher air throughput available to the UE.

The initial transmission delay incurs, for example, video initial play time delay, and causes user inconvenience. By contrast, when the TCP sender uses an initial window that is set to an arbitrary large value, buffer overflow and a packet drop are likely to occur because a network state and a radio channel state are not considered.

Therefore, it is important to set a proper initial window value in a radio channel state.

The above data is presented as background data only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure provides an apparatus and method for determining an initial window value in a wireless communication system.

In addition, an embodiment of the present disclosure provides an apparatus and method for determining an initial window value by using UE-related information at a TCP proxy in a wireless communication system.

Furthermore, an embodiment of the present disclosure provides an apparatus and method for determining an initial window value by using a reference table generated based on UE-related information at a TCP proxy in a wireless communication system.

Moreover, an embodiment of the present disclosure provides an apparatus and method for determining an initial window value by using radio access network information received from a UE at a TCP proxy in a wireless communication system.

An embodiment of the present disclosure also provides an apparatus and method for delivering UE-related information to a TCP proxy at a base station in a wireless communication system.

Technical Solution

A method for setting an initial window value in a wireless communication system proposed in an embodiment of the present disclosure includes receiving, by a proxy that splits transmission control protocol (TCP) connection between the UE and a server, uplink (UL) data transmitted from a user equipment (UE), extracting information related to the UE from the UL data, and setting the initial window value by using a reference table based on the information related to the UE.

Another method for setting an initial window value in a wireless communication system proposed in an embodiment of the present disclosure includes transmitting, by a UE, UL data comprising information related to the UE to a proxy that splits TCP connection between the UE and a server and receiving downlink (DL) data transmitted according to the initial window value that is set by using a reference table based on the information related to the UE.

Another method for setting an initial window value in a wireless communication system proposed in an embodiment of the present disclosure includes receiving, by an evolved NodeB (eNB), UL data transmitted from a UE, extracting information related to the UE from the UL data, determining based on the information related to the UE whether the UE has a closed subscriber group (CSG) identifier (ID) that allows access to the eNB, and transmitting the information related to the UE to a proxy that splits TCP connection between the UE and a server, if the UE has the CSG ID.

A proxy, which splits TCP connection between a UE and a server, for setting an initial window value in a wireless communication system proposed in an embodiment of the present disclosure includes a receiver configured to receive UL data transmitted from the UE, and a controller configured to extract information related to the UE from the UL data and to set the initial window value by using a reference table based on the information related to the UE.

A UE for setting an initial window value in a wireless communication system proposed in an embodiment of the present disclosure includes a transmitter configured to transmit UL data comprising information related to the UE to a proxy that splits TCP connection between the UE and a server and a receiver configured to receive DL data transmitted according to the initial window value that is set by using a reference table based on the information related to the UE.

An eNB for setting an initial window value in a wireless communication system proposed in an embodiment of the present disclosure includes a controller configured to receive UL data transmitted from a UE, to extract information related to the UE from the UL data, and to determine based on the information related to the UE whether the UE has a CSG ID that allows access to the eNB, and a transmitter configured to transmit the information related to the UE to a proxy that splits TCP connection between the UE and a server, if the UE has the CSG ID.

Other aspects, advantages, and key features of the present disclosure will be processed together with the attached drawings, and will be apparent to those of ordinary skill in the art from the following detailed description disclosing various embodiments of the present disclosure.

Before undertaking the DETAILED DESCRIPTION OF THE INVENTION below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables determination of an initial window value in a wireless communication system.

In addition, an embodiment of the present disclosure allows determination of an initial window value by using UE-related information at a TCP proxy in a wireless communication system.

Furthermore, an embodiment of the present disclosure makes it possible to determine an initial window value by using a reference table generated based on UE-related information at a TCP proxy in a wireless communication system.

Moreover, an embodiment of the present disclosure allows determination of an initial window value by using radio access network information received from a UE at a TCP proxy in a wireless communication system.

An embodiment of the present disclosure also makes it possible to deliver UE-related information to a TCP proxy at a base station in a wireless communication system.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, similar reference numerals will be understood to refer to identical or similar elements, features, and structures.

MODE FOR CARRYING OUT THE INVENTION

Figure 1:
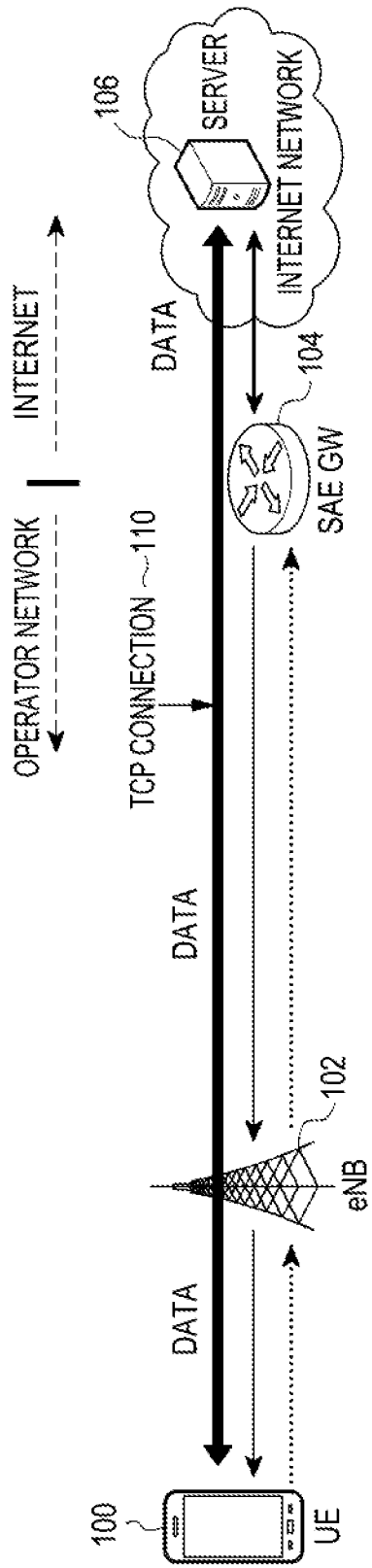
FIG. 1 illustrates a TCP connection between a UE and a server in an LTE communication system.

Hereinafter, embodiments of the present disclosure will be described in detail with reference to the accompanying drawings. In the following description, only parts necessary for understanding of operations according to embodiments of the present disclosure will be described and other parts will not be described not to obscure the subject matter of the present disclosure. Further, the terminologies to be described below are defined in consideration of functions in the embodiments of the present disclosure and may vary depending on a user's or operator's intention or practice. Therefore, the definitions should be made based on the contents throughout the entire description of the present disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

It is to be understood that the singular forms "a," "an," and "the" include plural referents unless the context clearly dictates otherwise. Thus, for example, reference to "a component surface" includes reference to one or more of such surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various embodiments of the present disclosure may be a device including a communication function. For example, an electronic device may include a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device (e.g., a head-mounted device (HMD), electronic clothing, an electronic bracelet, an electronic necklace, an electronic appcessory, an electronic tattoo, or a smart watch.

According to various embodiments of the present disclosure, the electronic device may be a smart home appliance having a communication function. For example, the smart home appliance may include a TV, a digital video disk (DVD) player, audio equipment, a refrigerator, an air conditioner, a vacuum cleaner, an oven, a microwave oven, a washer, a drier, an air cleaner, a set-top box, a TV box (e.g., HomeSync™ of Samsung, TV™ of Apple, or TV™ of Google), a game console, an electronic dictionary, a camcorder, and an electronic frame.

According to various embodiments of the present disclosure, the electronic device may include medical equipment (e.g., a magnetic resonance angiography (MRA) device, a magnetic resonance imaging (MRI) device, a computed tomography (CT) device, an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system, gyroscope, and gyro compass for ships), avionics, a security device, an industrial or home robot, and so forth.

According to some embodiments, the electronic device may include a part of a furniture or building/structure having a communication function, an electronic board, an electronic signature receiving device, a projector, and various measuring instruments (for example, a water, electricity, gas, or electric wave measuring device).

The electronic device according to various embodiments of the present disclosure may be one of the above-listed devices or a combination thereof. It will be obvious to those of ordinary skill in the art that the electronic device according to various embodiments of the present disclosure is not limited to the above-listed devices.

A method and apparatus proposed in an embodiment of the present disclosure are applicable to various communication systems such as an Institute of Electrical and Electronics Engineers (IEEE) 802.11 communication system, an IEEE 802.16 communication system, a digital multimedia broadcasting (DMB) service, a digital video broadcasting-handheld (DVB-H) service, and a mobile broadcasting service such as an Advanced Television Systems Committee-Mobile/Handheld (ATSC-M/H) service, a digital video broadcasting system such as an Internet protocol television (IPTV) service, an Moving Picture Experts Group (MPEG)

media transport (MMT) system, an evolved packet system (EPS), an Long Term Evolution (LTE) communication system, an LTE-Advanced (LTE-A) communication system, a high-speed downlink packet access (HSDPA) mobile communication system, a high-speed uplink packet access (HSUPA) mobile communication system, a 3rd-Generation (3G) Project Partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, a mobile Internet protocol (IP), and so forth.

FIG. 1 illustrates a transmission control protocol (TCP) connection between a UE and a server in an LTE communication system.

Referring to FIG. 1, the illustrated LTE communication system may include a user equipment (UE) 100, an evolved NodeB (eNB) 102, a system architecture evolution (SAE) gateway (GW) 104, and a server 106. Herein, the server 106 is assumed to be an Internet server connected over an Internet network.

The UE 100 establishes TCP connection with the server 106 to receive a service as indicated by 110. Since the TCP is an end-to-end protocol, related settings may be changed only by the UE 100 and the server 106. That is, assuming that the UE 100 receives video data from the server 106, an initial window value is determined by the server 106 that is a TCP sender located outside an LTE network.

Figure 2:
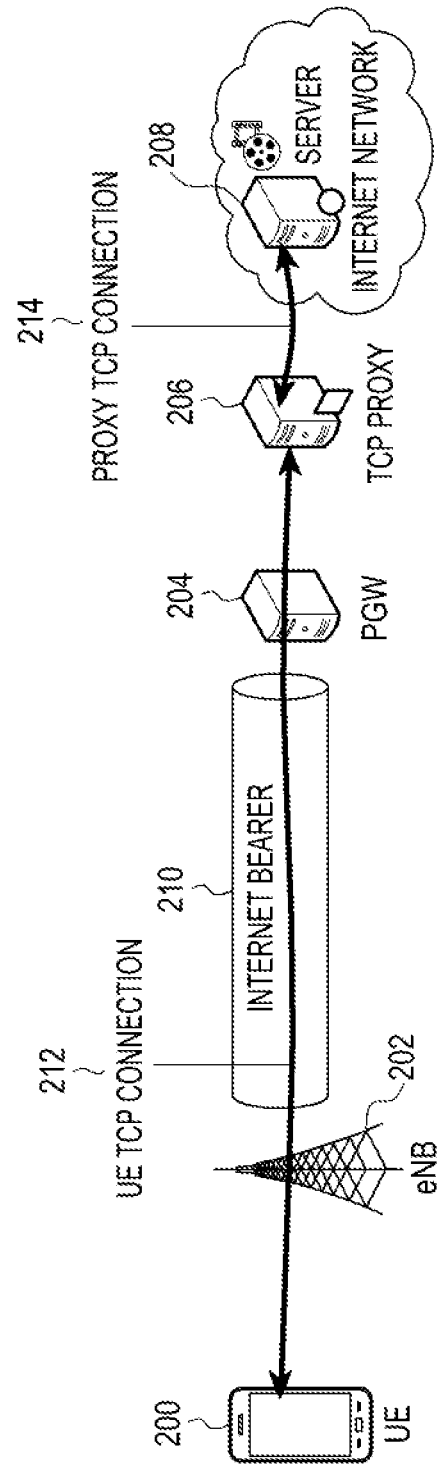
FIG. 2 illustrates TCP connection between a UE and a server in an LTE communication system according to an embodiment of the present disclosure.

FIG. 2 illustrates TCP connection between a UE and a server in an LTE communication system according to an embodiment of the present disclosure.

Referring to FIG. 2, the illustrated LTE communication system may include a UE 200, an eNB 202, a packet data network (PDN)-gateway (PGW) 204, a TCP proxy 206, and a server 208. An Internet bearer 210 is provided between the eNB 202 and the PGW 204, and the server 208 is assumed to be an Internet server connected over the Internet network.

The TCP proxy 206 is located in a rear end of the PGW 204, and manages TCP connection for traffic destined from the UE 200 to the Internet network. The TCP proxy 206 splits TCP connection between the UE 200 and the server 208 into UE TCP connection 212 and proxy TCP connection 214. In this case, the TCP proxy 206 acts as a server for the UE TCP connection 212 and as a UE for the proxy TCP connection 214.

In this way, by splitting connection of the TCP that is an end-to-end protocol, the TCP proxy 206 may have an authority to change related settings that have been changeable only by the server 208, for example, an initial window size, etc.

The UE and the TCP proxy have the following functions according to an embodiment of the present disclosure.

UE Function

The UE incorporates UE-related information, i.e., UE information, in uplink (UL) data and delivers the UE information through the UL data to the TCP proxy. The UL data may be any type of data transmitted by the UE, such as a TCP SYN packet and a TCP ACK packet. The UE information may include, for example, radio access network (RAN) information, TCP flow information, location information, and mobility information, as will be described in more detail with reference to Table 1.

TABLE 1

| Item | Whether Included or Not | Description |
| --- | --- | --- |
| Radio Channel Information | Mandatory Information | Modulation and Coding Scheme (MCS) |
| Serving Cell ID | Mandatory Information | ECGI (eNB Cell Global ID) |
| TCP Flow Information | Mandatory Information | Flow Duration, Application Type |
| Location Information | Option information | Location in Cell (Center, Middle, Edge) |
| Mobility Information | Option information | MSE (Mobility State Estimation) |

In Table 1, radio channel information indicates information related to an available radio throughput of the UE and may be indicated by, for example, an MCS. The MCS is a measure of radio channel quality, and the UE may obtain an MCS allocated by the eNB through a physical downlink control channel (PDCCH). The TCP proxy may identify UE's radio channel quality based on UE information received from the UE, for example, the MCS.

However, the radio throughput that is actually available to the UE may be known after a radio block allocated by the eNB is reflected to the MCS, and thus, the TCP proxy may not be aware of the radio throughput allocated to the UE merely based on the MCS. To solve this problem, an embodiment of the present disclosure proposes a scheme in which a reference table indicating a round trip time (RTT) and a throughput based on an MCS is generated for use in determination of an initial window size, and a scheme for generating and using the reference table will be described in detail later. While the MCS is used as an example of an index of radio channel information in Table 1, a reference signal received power (RSRP), a reference signal received quality (RSRQ), a received signal strength indicator (RSSI), a channel quality indication (CQI), a signal-to-noise ratio (SNR), etc., may also be considered as the index of radio channel information.

The serving cell ID indicates information about a cell to which the UE is connected, and may be indicated by, for example, an evolved cell global ID (ECGI). The UE may obtain the ECGI through a system information block (SIB) message.

The radio channel information and the serving cell ID are included in the RAN information, and the TCP proxy may know a location of the UE and radio channel quality the UE secures in the location based on the radio channel information and the serving cell ID.

The TCP flow information indicates information about a TCP flow to be generated/used by the UE, and may include flow duration information and application type information, e.g., App name/category information, of the TCP flow. The flow duration information indicates a duration of the TCP flow for data transmission and reception. For example, flow duration information of a TCP flow generated for search like Google may be indicated by a short/thin flow, and flow duration information of a TCP flow generated for downloading/streaming of high-volume video like YouTube may be indicated by a long/fat flow. The flow duration information may also be indicated by an expected time value.

The App name/category information indicates information about an application that generates/uses a TCP flow. The TCP flow information including the flow duration information and the App name/category information is used to generate and manage a reference table, and the radio channel information, the serving cell ID, and the TCP flow information correspond to mandatory information that has to be included in UL data.

The location information and the mobility information correspond to option information that may be additionally included in the UL data.

The location information indicates a UE's location in a cell, and the UE measures the UE's location in the cell using a value delivered through measurement criteria/event.

Assuming that the location information is indicated by center/middle/edge, the UE determines its location to be the center of the cell if a signal strength of a neighboring cell is less than or equal to a first threshold, to be the middle of the cell if the signal strength of the neighboring cell exceeds the first threshold and a signal strength of a serving cell is greater than or equal to a second threshold value, and to be the edge of the cell if the signal strength of the neighboring cell exceeds the first threshold and the signal strength of the serving cell is less than the second threshold value.

The mobility information indicates a speed at which the UE moves, and may be indicated by, for example, an MSE. The MSE means a time during which the UE stays in 16 cells the UE has visited most recently.

Assuming that the mobility information is indicated by high/mid/low, the UE determines its mobility to be high if a time during which the UE stays in the 16 cells is less than or equal to a third threshold, to be mid if the time exceeds the third threshold and is less than or equal to a fourth threshold, and to be low if the time exceeds the fourth threshold value.

TCP Proxy Function

The TCP proxy groups UEs according to specific criteria based on the UE information received from the UE, and measures group-specific throughput and RTT. The TCP proxy splits a TCP flow into a TCP flow for throughput measurement and a TCP flow for RTT measurement and measures the throughput and the RTT.

The TCP proxy generates and manages a reference table to be used for determination of an initial window value based on the measured throughput and RTT. The TCP proxy derives an MCS-specific UE's available radio throughput value from the reference table, and determines the derived value to be an initial window value to be used by an UE having the corresponding MCS.

Such TCP proxy functions may be classified into:
1) Reference Table Generation and Management;
2) Splitting into TCP Flow for Throughput Measurement and TCP Flow for RTT Measurement;
3) Throughput Measurement based on TCP Flow for Throughput Measurement;
4) RTT Measurement based on TCP Flow for RTT Measurement; and
5) Setting of Initial Window Value based on Reference Table.

A detailed description will be made of each of the TCP proxy functions according to an embodiment of the present disclosure.

1) Reference Table Generation and Management

The TCP proxy extracts UE information from UL data received from a UE, and generates a reference table based on the extracted UE information. That is, the TCP proxy groups UEs according to specific criteria for each serving cell and measures group-specific throughput and RTT, and generates a reference table based on the measured throughput and RTT. In an embodiment of the present disclosure, it is assumed that the TCP proxy measures a throughput and an RTT with respect to MCS-specifically grouped UEs for each ECGI.

The TCP proxy identifies a serving cell ID from the extracted UE information, and if data about a cell is not included in the reference table, the TCP proxy adds the data about the cell to the reference table.

Table 2 shows an example of a reference table that is initially generated based on an MCS for a particular ECGI. The TCP proxy may generate the reference table like Table 2 when receiving UL data that is initially transmitted by a UE located in a cell related to the particular ECGI, or may generate the reference table in advance for an eNB/cell managed by the TCP proxy.

TABLE 2

| ECGI | MCS | Updated Time | RTT | Updated Time | Throughput |
|---|---|---|---|---|---|
| 1 | 0 | | | | |
| | 1 | | | | |
| | ... | | | | |
| | 27 | | | | |
| | 28 | | | | |

The ECGI and the MCS are values extracted from the UL data received from the UE, and the RTT and the throughput are values to be measured by the TCP proxy. The updated time means time in which the RTT or the throughput is measured last, and the TCP proxy may select and use the RTT and the throughput through the updated time.

In Table 2, the TCP proxy groups UEs for each MCS (MCS 0-28) and measures an RTT and a throughput for each MCS. In another example, the TCP proxy may group UEs based on location information or mobility information. Hereinbelow, a description will be made of a case where the TCP proxy groups UEs for each location information (center/middle/edge) and measures an RTT and a throughput for each location information using Table 3.

Table 3 shows an example of a reference table that is initially generated based on location or position information for a particular ECGI.

TABLE 3

| ECGI | Position Information | Updated Time | RTT | Updated Time | Throughput |
|---|---|---|---|---|---|
| 1 | center | | | | |
| | middle | | | | |
| | edge | | | | |

Hereinbelow, a description will be made of a case where the TCP proxy groups UEs for each mobility information (high/mid/low) and measures an RTT and a throughput for each mobility information.

Table 4 shows an example of a reference table that is initially generated based on mobility information for a particular ECGI.

TABLE 4

| ECGI | Mobility Information | Updated Time | RTT | Updated Time | Throughput |
|---|---|---|---|---|---|
| 1 | high | | | | |
| | mid | | | | |
| | low | | | | |

2) Splitting into TCP Flow for Throughput Measurement and TCP Flow for RTT Measurement The TCP proxy extracts UE information from UL data received from the UE and splits a TCP flow into a TCP flow for throughput measurement and a TCP flow for RTT measurement based on TCP flow information of the extracted UE information.

The TCP flow information includes the flow duration information and the App type information, and the TCP flow splitting operation may be applied based on information of the TCP flow information as will be described below.

For example, the TCP proxy may split the TCP flow based on the flow duration information of the TCP flow information as below.

The TCP proxy classifies the TCP flow as a TCP flow for RTT measurement if the flow duration information indicates a short/thin flow. That is, for the short/thin flow, the amount of data transmitted and received in the TCP flow is small and thus there is no time consumed for data transmission, such that that flow is suitable for RTT measurement.

The TCP proxy classifies the TCP flow as a TCP flow for throughput measurement if the flow duration information indicates a long/fat flow. That is, for the long/fat flow, the amount of data transmitted and received in the TCP flow is large, such that that flow is suitable for measurement of a throughput used for data transmission and reception of the UE.

Criteria according to which the UE classifies the flow duration information as the short/thin flow and the long/fat flow may be directly determined by the UE that executes an application or may be set by the TCP proxy and delivered to the UE. For example, a destination IP address may be used as a classification criterion.

In another example, the flow duration information may also be indicated by an expected time value.

Next, a description will be made of an example where the TCP proxy may split the TCP flow based on the App type information of the TCP flow information.

The TCP proxy classifies the TCP flow as a TCP flow for RTT measurement if the App type information indicates a search engine (e.g., Google), a message (e.g., a Kaka talk), etc. The TCP proxy classifies the TCP flow as a TCP flow for throughput measurement if the App type information indicates a video service (e.g., YouTube), etc. The App type information may be, for example, the App name/category information, and a criterion according to which the UE classifies the App type information may be determined directly by a UE that executes an App or may be set by the TCP proxy and delivered to the UE. For example, a destination IP address may be used as a classification criterion.

The TCP proxy may also classify the TCP flow into a TCP flow for RTT measurement and a TCP flow for throughput measurement based on information included in UL data of the UE, for example, the destination IP address, as well as the TCP flow information.

Figure 3:
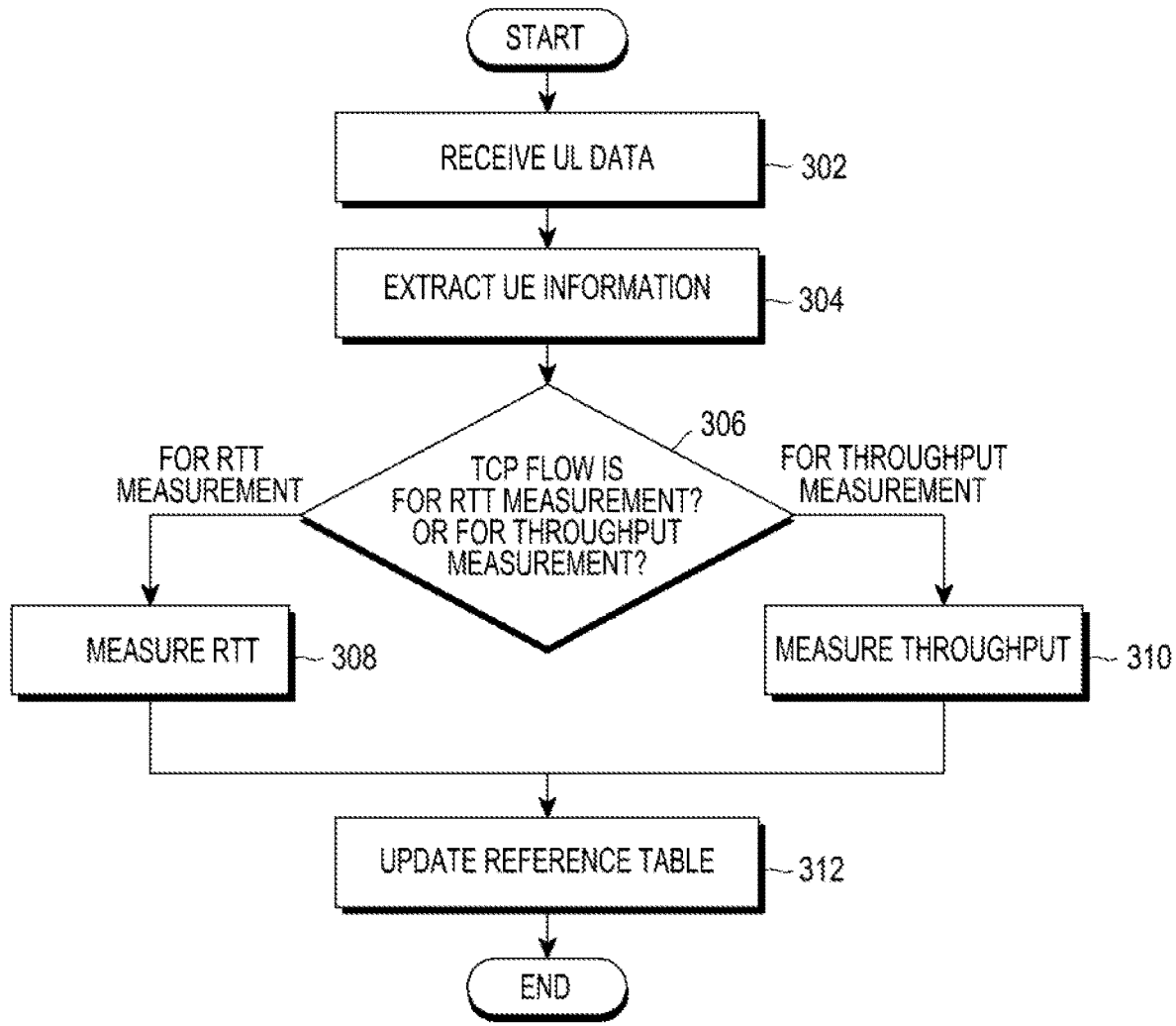
FIG. 3 is a flowchart of an operation of classifying a TCP flow as a TCP flow for throughput measurement and a TCP flow for RTT measurement at a TCP proxy in an LTE communication system according to an embodiment of the present disclosure.

FIG. 3 is a flowchart of an operation of classifying a TCP flow as a TCP flow for throughput measurement and a TCP flow for RTT measurement at a TCP proxy in an LTE communication system according to an embodiment of the present disclosure.

Referring to FIG. 3, the TCP proxy receives UL data from the UE in operation 302, and extracts UE information from the UL data in operation 304.

In operation 306, the TCP proxy determines whether the TCP flow is for RTT measurement or throughput measurement based on TCP flow information of the UE information.

If determining that the TCP flow is for RTT measurement in operation 306, the TCP proxy measures an RTT in operation 308. If determining that the TCP flow is for throughput measurement in operation 306, the TCP proxy measures a throughput in operation 310.

The TCP proxy may consider the flow duration information or the App type information to classify the TCP flow as a TCP flow for RTT measurement or a TCP flow for throughput measurement, and the operation of classifying the TCP flow based on the flow duration information or the App type information has been described above and thus will not be described in detail at this time. RTT and throughput measurement will be described in detail below.

In operation 312, the TCP proxy updates a reference table used for determination of an initial window value based on measurement values of operations 308 and 310. The reference table may be updated each time the TCP proxy receives UL data, or at predetermined time intervals, or each time the UE sets up a new TCP session.

3) Throughput Measurement Based on TCP Flow for Throughput Measurement

The TCP proxy measures the amount of packets passing through the TCP proxy for a predetermined time in a TCP flow classified as a TCP flow for throughput measurement. That is, to find out a maximum throughput, the TCP proxy sets a predetermined time after the elapse of an arbitrary time from start of a TCP session and measures the amount of packets. The TCP proxy may transmit a probing packet for finding out a throughput or may use other known methods.

4) RTT Measurement Based on TCP Flow for RTT Measurement

Figure 4:
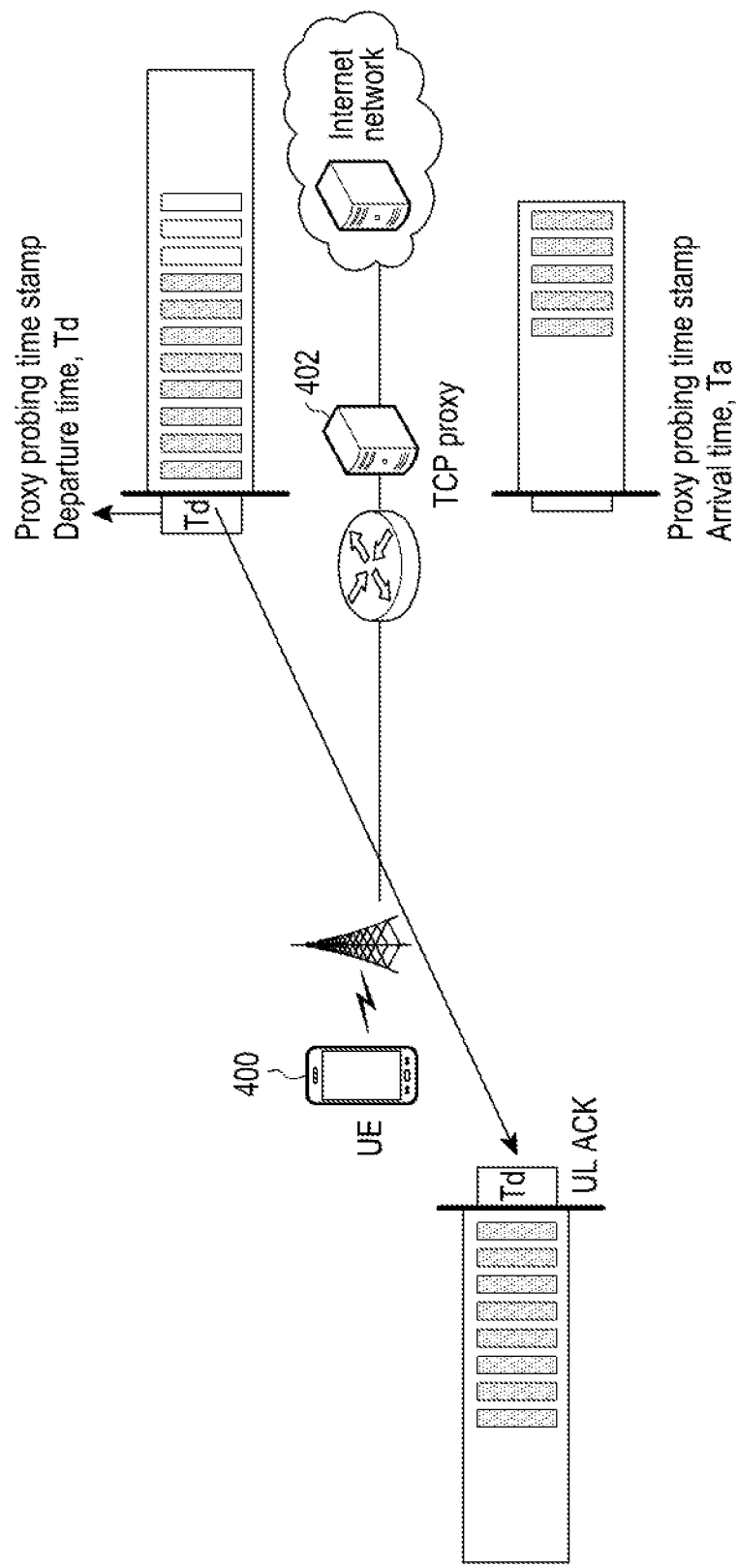
FIG. 4 illustrates RTT measurement at a TCP proxy in an LTE communication system according to an embodiment of the present disclosure.

FIG. 4 illustrates RTT measurement at a TCP proxy in an LTE communication system according to an embodiment of the present disclosure.

Referring to FIG. 4, a TCP proxy 402 incorporates time stamp information in a DL packet and transmits the time stamp information through the DL packet to a UE 400. The time stamp information may be indicated as, for example, departure time Td, and means time in which the DL packet is transmitted.

The UE 400 having received the DL packet transmits the time stamp information Td through an UL packet, e.g., a TCP ACK packet, and the TCP proxy 402 receives the TCP ACK packet including the time stamp information Td. The TCP proxy 402 detects time to receive the TCP ACK packet, i.e., arrival time Ta, and measures an RTT based on a difference between Td and Ta. Herein, the RTT is measured by Td−Ta as an example, but other known methods may also be used for RTT measurement.

The TCP proxy measures a throughput and an RTT as described in functions 3) and 4), and updates a reference table based on the measured throughput and RTT. Since the reference table is updated at predetermined time intervals or each time the UE sets up a new TCP session, the TCP proxy may maintain the latest throughput and RTT for each MCS.

Table 5 shows an example of a reference table that is generated and maintained based on an MCS for a particular ECGI.

TABLE 5

| ECGI | MCS | RTT Updated Time | RTT | Throughput Updated Time | Throughput |
|---|---|---|---|---|---|
| 1 | 0 | T1 | 100 ms | T1 | 2 |
|  | 1 | T2 | 80 ms | T2 | 5 |
|  | ... | ... | ... | ... | ... |
|  | 27 | T3 | 100 ms | T3 | 24 |
|  | 28 | T1 | 80 ms | T1 | 26 |

The TCP proxy stores a reference table like Table 5 based on a particular condition, and uses the reference table to determine an initial window value. Herein, the particular condition may be, for example, a date, time, occurrence of a particular event, etc., and the particular event may be, for example, sports broadcasting in which much real-time video streaming traffic is generated.

Table 6 shows an example of a reference table stored based on a particular condition, e.g., a particular date or time. The reference table of Table 6 is assumed to be a reference table generated and maintained based on an MCS for a particular ECGI.

TABLE 6

| ECGI | History | MCS | RTT | Throughput |
|------|---------|-----|-----|------------|
| 1 | 2015 Jan. 14 or 16:00:00 or etc. | 0 | 110 ms | 2 |
|  |  | 1 | 80 ms | 5 |
|  |  | ... | ... | ... |
|  |  | 27 | 100 ms | 24 |
|  |  | 28 | 80 ms | 26 |

5) Setting of Initial Window Value Based on Reference Table

Figure 5:
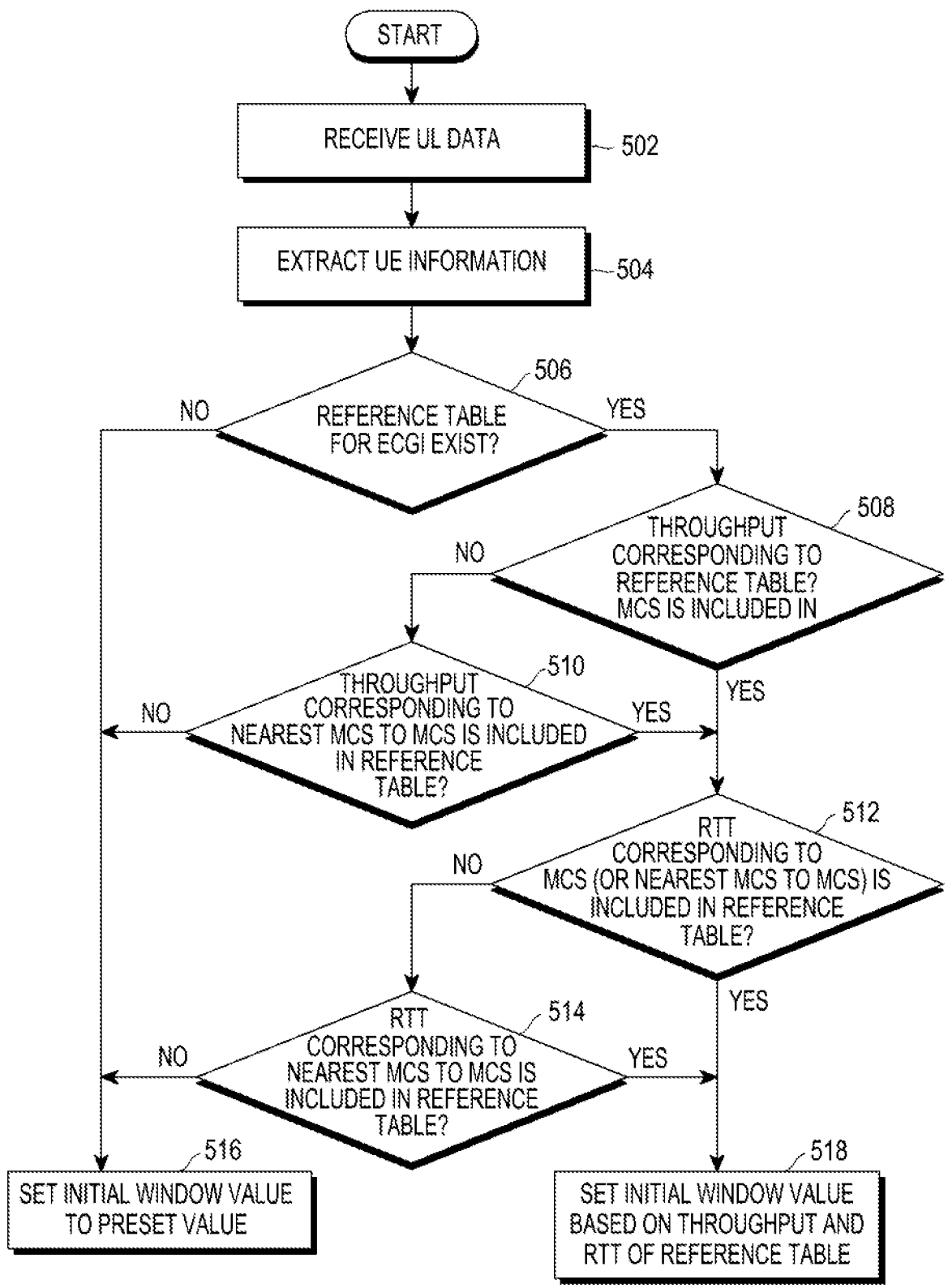
FIG. 5 is a flowchart of an operation of determining an initial window value at a TCP proxy in an LTE communication system according to an embodiment of the present disclosure.

FIG. 5 is a flowchart of an operation of determining an initial window value at a TCP proxy in an LTE communication system according to an embodiment of the present disclosure.

Referring to FIG. 5, in operation 502, a TCP proxy receives UL data received from a UE, for example, a TCP SYN packet that is a TCP session setup request message. In operation 504, the TCP proxy extracts UE information included in an option field of the TCP SYN packet.

In operation 506, the TCP proxy determines whether there exists a reference table in which a throughput and an RTT are included for an ECGI included in the UE information. If determining that the reference table exists in operation 506, the TCP proxy determines whether a throughput corresponding to an MCS included in the UE information is included in the reference table in operation 508. If determining that the reference table does not exist in operation 506, the TCP proxy sets an initial window value to a preset value 4 KB in operation 516. While it is described that the preset value is 4 KB as an example, the preset value may be changed.

If determining that the throughput corresponding to the MCS is included in the reference table in operation 508, the TCP proxy determines whether an RTT corresponding to the MCS is included in the reference table in operation 512. If determining that the RTT corresponding to the MCS is included in the reference table in operation 512, the TCP proxy sets an initial window value based on the throughput and the RTT corresponding to the MCS provided in the reference table in operation 518.

If determining that the throughput corresponding to the MCS is not included in the reference table in operation 508, the TCP proxy determines whether a throughput corresponding to an MCS that is nearest to the MCS is included in the reference table in operation 510. The nearest MCS to the MCS may be set to, for example, the MCS±1 or ±2.

If determining that the throughput corresponding to the nearest MCS is included in the reference table in operation 510, the TCP proxy determines whether an RTT corresponding to the nearest MCS is included in the reference table in operation 512. If determining that the RTT corresponding to the nearest MCS is included in the reference table in operation 512, the TCP proxy sets an initial window value based on the throughput and the RTT corresponding to the nearest MCS provided in the reference table in operation 518.

If determining that the throughput corresponding to the nearest MCS is not included in the reference table in operation 510, the TCP proxy sets the initial window value to the preset value 4 KB in operation 516.

If determining that the RTT corresponding to the MCS is not included in the reference table in operation 512, the TCP proxy determines whether an RTT corresponding to the nearest MCS is included in the reference table in operation 514. If determining that the RTT corresponding to the nearest MCS is included in the reference table in operation 514, the TCP proxy sets an initial window value based on the throughput and the RTT corresponding to the nearest MCS provided in the reference table in operation 518.

If determining that the RTT corresponding to the nearest MCS is not included in the reference table in operation 514, the TCP proxy sets the initial window value to the preset value 4 KB in operation 516.

In an embodiment of the present disclosure, to determine an initial window value, a bandwidth-delay product equation is used. The bandwidth-delay product equation indicates a maximum amount of data that may be transmitted in a data link, and is expressed as a product of a speed and a delay of the data link.

In an embodiment of the present disclosure, the TCP proxy calculates the initial window value using Equation (1).

$$\text{Initial Window Value} = \text{Throughput} * \text{RTT} \qquad \text{Equation 1}$$

In Equation (1), the throughput and the RTT are based on values of a current reference table, but in another example, the TCP proxy may calculate the initial window value using Equation (2).

$$\text{Initial Window Value} = \alpha(\text{Throughput} * \text{RTT}) + \beta(\text{Throughput} * \text{RTT}) \qquad \text{Equation 2}$$

Equation (2) reflects values of a current reference table and values of a previously stored table value at an arbitrary ratio, in which α indicates a weight value for reflection of the values of the current reference table and β indicates a weight value for reflection of the values of the previously stored table or values of Tables 3 and 4.

In another example, if a plurality of UEs access one eNB, the TCP proxy may reflect the number of UEs accessing the eNB and calculate the initial window value to control eNB congestion that may occur due to simultaneous setting of a large initial window value to the UEs.

Meanwhile, the UE according to an embodiment of the present disclosure performs an additional function such as UE information transmission. However, if the UE moves using a roaming service to a network to which the TCP proxy is not applied, the UE does not need to perform the additional function. To this end, the UE performs an operation of determining whether the TCP proxy is applied to the network to determine whether to perform the additional function.

Figure 6:
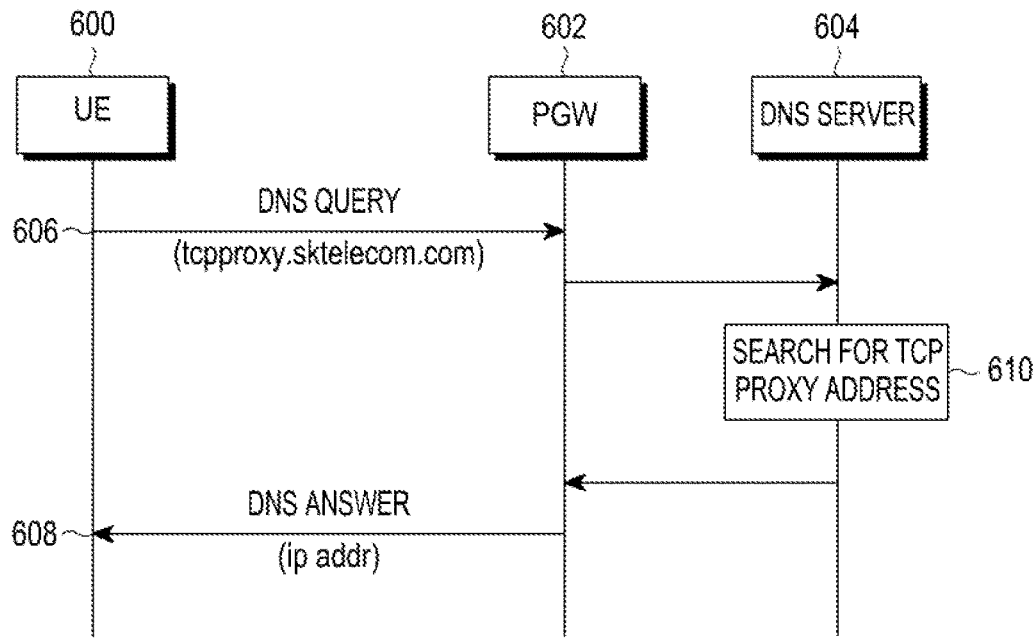
FIG. 6 is a ladder diagram of an operation of determining whether a TCP proxy is applied to a related network at a UE in an LTE communication system according to an embodiment of the present disclosure.

FIG. 6 is a ladder diagram of an operation of determining whether a TCP proxy is applied to a related network at a UE in an LTE communication system according to an embodiment of the present disclosure.

Referring to FIG. 6, the illustrated LTE system may include a UE 600, a PGW 602, and a domain name system (DNS) server 604.

The UE 600 transmits a DNS query 606 to the DNS server 604 through the PGW 602, and the DNS server 604 searches for a TCP proxy address the UE 600 accesses in operation 610. The DNS server 604 transmits the TCP proxy address through a DNS answer 608 if succeeding in searching for the TCP proxy address.

The UE 600 having obtained the TCP proxy address from the DNS server 604 activates a UE information transmission function.

As such, the UE 600 activates the UE information transmission function only when accessing the network to which the TCP proxy is applied, and deactivates the UE information transmission function if accessing a network to which the TCP proxy is not applied.

The TCP proxy identifies a UE capability based on whether UL data received from the UE 600 includes UE information.

If an operator manages the TCP proxy, the operator may set a condition for activation or deactivation of the UE information transmission function in an over-the-air (OTA) manner, etc.

An embodiment of the present disclosure proposes a TCP proxy function that may be implemented in another apparatus independently of a media server or may be implemented in a server.

In the above-described embodiment of the present disclosure, determination of an initial window value using the bandwidth-delay product equation based on a throughput and an RTT has been described. However, if the TCP proxy obtains supportable bandwidth information and basic service set (BSS) load information of a network, the TCP proxy may determine the initial window value without using the bandwidth-delay product equation. The following description will be made of a method for determining the initial window value without using the bandwidth-delay product equation with reference to FIG. 7.

Figure 7:
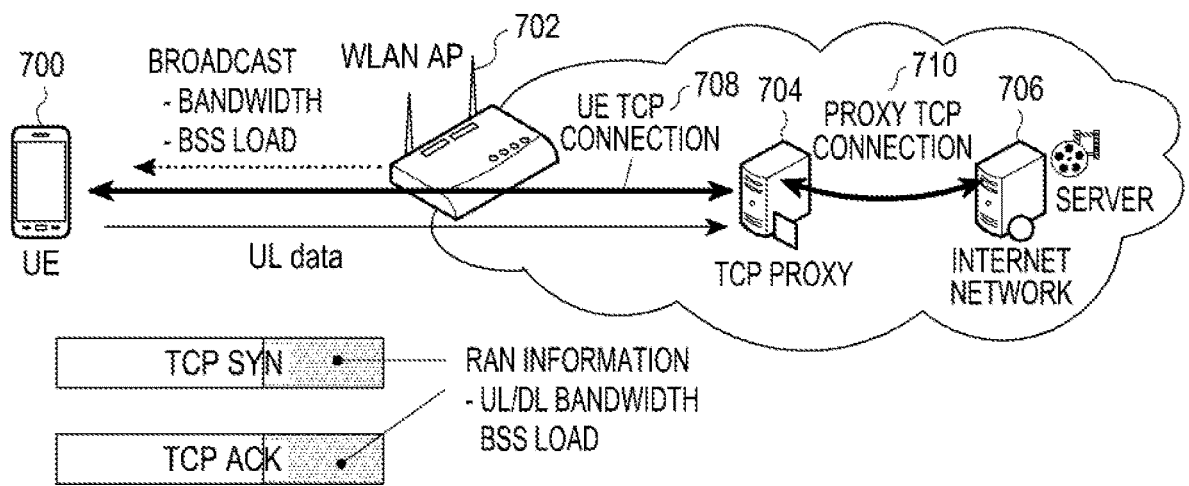
FIG. 7 is a flowchart of an operation of determining an initial window value at a TCP proxy in an LTE communication system according to another embodiment of the present disclosure.

FIG. 7 is a flowchart of an operation of determining an initial window value at a TCP proxy in an LTE communication system according to another embodiment of the present disclosure.

Referring to FIG. 7, the illustrated LTE communication system may include a UE 700, a wireless local area network (WLAN) access point (AP) 702, a TCP proxy 704, and a server 706. Herein, the server 706 is assumed to be an Internet server connected over an Internet network. The TCP proxy 704 splits TCP connection between the UE 700 and the server 706 into UE TCP connection 708 and proxy TCP connection 710. In this case, the TCP proxy 704 acts as a server for the UE TCP connection 708 and as a UE for the proxy TCP connection 710.

The WLAN AP 702 broadcasts a supportable bandwidth and a BSS load, and the UE 700 transmits the information obtained from the WLAN AP 702, i.e., RAN broadcasting information to the TCP proxy 704 through UL data. Herein, the RAN broadcasting information may include, for example, a WLAN AP ID, and the supportable bandwidth and BSS load information broadcast from the WLAN AP 702. The WLAN AP ID may be, for example, a BSS ID, and the supportable bandwidth may be an UL/DL bandwidth supported by the WLAN AP 702. The BSS load indicates a UE's connection state with respect to each AP, and may be indicated by, for example, a channel use rate (%).

The TCP proxy 704 having received RAN broadcasting information from the UE 700 through a UE TCP connection 708 determines an initial window value based on a UL/DL bandwidth value and a BSS load value. For example, the TCP proxy 704 may calculate the initial window value by multiplying a weight-applied BSS load value by the UL/DL bandwidth value.

A TCP proxy proposed in another embodiment of the present disclosure may be implemented independently or together with a server. For example, if the TCP proxy is implemented with a specific server, the UE does not experience an initial delay when using a service provided from a related server.

In the above-described embodiment and another embodiment, the TCP proxy determines the initial window value by using information transmitted from the UE. However, to use information transmitted from the UE, an additional function of the UE for the transmission is needed. The following description will be made of a method for determining the initial window value based on radio channel information managed by the eNB with reference to FIG. 8.

Figure 8:
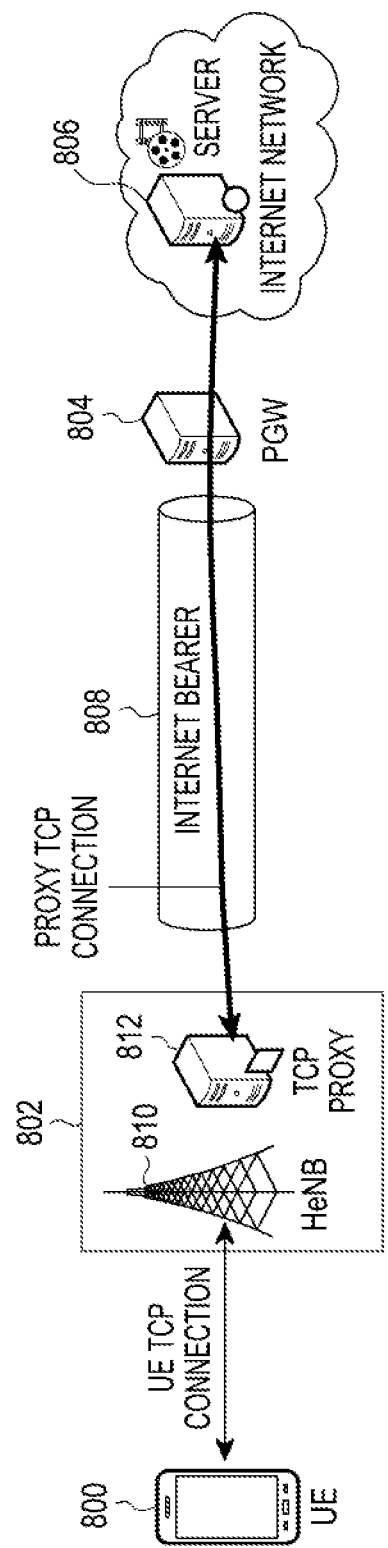
FIG. 8 is a flowchart of an operation of determining an initial window value at a TCP proxy in an LTE communication system according to another embodiment of the present disclosure.

FIG. 8 is a flowchart of an operation of determining an initial window value at a TCP proxy in an LTE communication system according to another embodiment of the present disclosure.

Referring to FIG. 8, the illustrated LTE communication system may include a UE 800, an eNB unit 802, a PGW 804, and a server 806. An Internet bearer 808 is provided between the eNB unit 802 and the PGW 804, and the server 806 is assumed to be an Internet server connected over the Internet network.

In FIG. 8, for example, the eNB unit 802 includes a home eNB (HeNB) 810 and a TCP proxy 812 connected to each other through an internal interface. However, the eNB unit 802 may include only the HeNB 810 if the TCP proxy functions are implemented in the HeNB 810.

The HeNB 810 further includes an admission control function based on a closed subscriber group (CSG) in addition to functions of an eNB, and is used in a home network or enterprise-oriented manner, and the HeNB is identified by a CSG ID. Only a UE having an access-allowed CSG ID may access the HeNB.

The HeNB 810 delivers only Internet data of UL data received from the UE 800 to the TCP proxy 812. For example, in the LTE communication system, the HeNB 810 delivers a bearer destined to an Internet PDN to the TCP proxy 812, thus forwarding only the Internet data to the TCP proxy 812.

Upon receiving a TCP SYN packet, which is a TCP session setup request message, from the UE 800, the HeNB 810 identifies available radio resources and throughput of the UE 800 and delivers related information to the TCP proxy 812. The TCP proxy 812 determines an initial window value based on the information received from the HeNB 810.

The HeNB 810 may operate in a closed mode, an open mode, and a hybrid mode, in which the closed mode is available to only a UE having an authority to access the HeNB 810, the open mode is available to any UE, and the hybrid mode is a mode where the closed mode and the open mode are combined in one HeNB. That is, the hybrid mode allows differentiated treatment for a UE accessing in the closed mode. Moreover, the initial delay reducing service based on initial window value determination described in another embodiment of the present disclosure may be provided only to the UE accessing in the closed mode.

Figure 9:
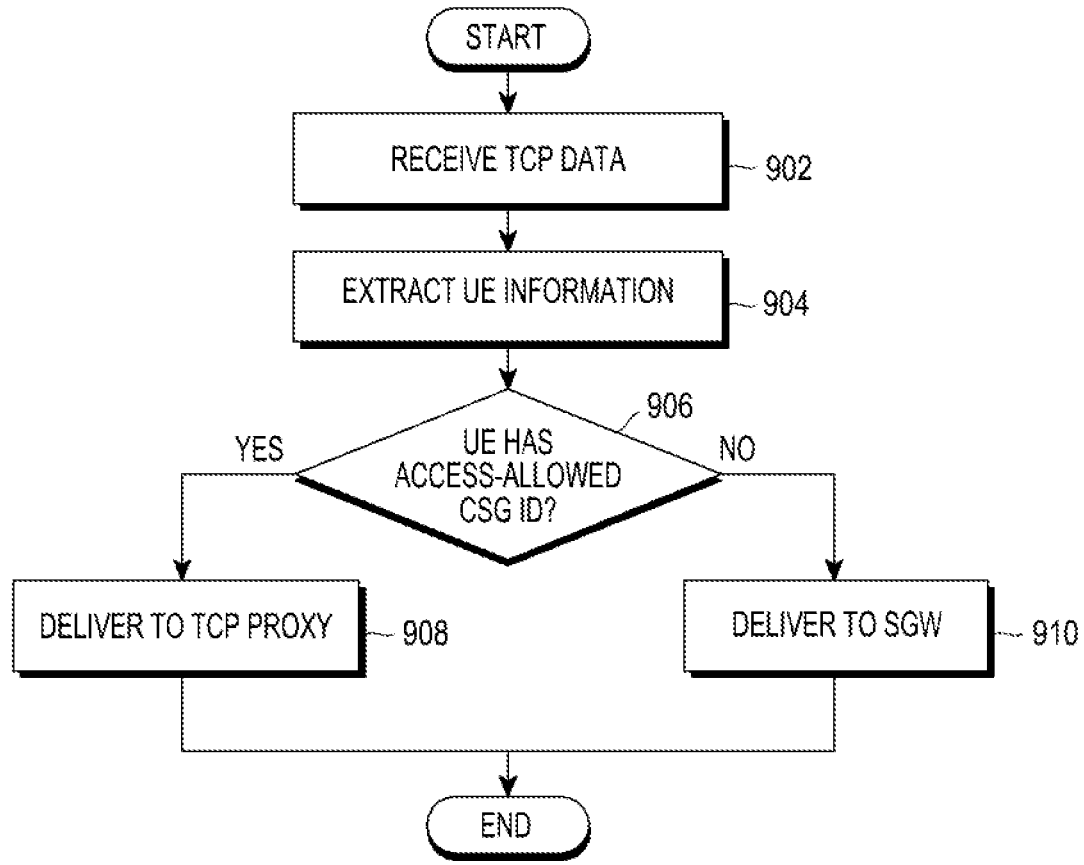
FIG. 9 is a flowchart of an operation of transmitting Internet data to a TCP proxy at an HeNB in an LTE communication system according to another embodiment of the present disclosure.

FIG. 9 is a flowchart of an operation of transmitting Internet data to a TCP proxy at an HeNB in an LTE communication system according to another embodiment of the present disclosure.

Referring to FIG. 8, the HeNB is assumed to operate in a hybrid mode.

The HeNB receives UL data, for example, a TCP SYN packet that is a TCP session setup request message, from the UE in operation 902, and extracts UE information from the TCP SYN packet in operation 904.

In operation 906, the HeNB determines based on the UE information whether the UE has a CSG ID that allows connection to the HeNB. If determining that the UE has the CSG ID that allows access to the HeNB in operation 906, the HeNB delivers the UE information to the TCP proxy in operation 908. However, if determining that the UE does not have the CSG ID that allows connection to the HeNB in operation 906, the HeNB delivers the UE information to the SGW in operation 910.

Figure 10:
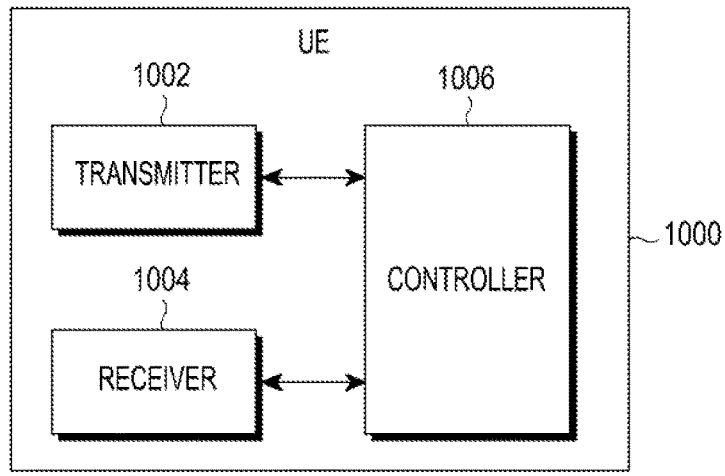
FIG. 10 is a block diagram of an internal structure of a UE, which is related to initial window value determination, in an LTE communication system according to an embodiment of the present disclosure.

FIG. 10 is a block diagram of an internal structure of a UE, which is related to initial window value determination, in an LTE communication system according to an embodiment of the present disclosure.

Referring to FIG. 10, a UE 1000 may include a transmitter 1002, a receiver 1004, and a controller 1006.

The controller 1006 controls an overall operation of the UE 1000. In particular, the controller 1006 controls an overall operation related to determination of an initial window value according to an embodiment of the present disclosure. Herein, the overall operations related to resource management are the same as those described above with reference to FIGS. 2 through 7, and thus will not be described in detail at this time.

The transmitter 1002 transmits various messages under control of the controller 1006. Herein, various messages transmitted by the transmitter 1002 are the same as those described above with reference to FIGS. 2 through 7, and thus will not be described in detail at this time.

The receiver 1004 receives various messages under control of the controller 1006. Herein, various messages received by the receiver 1004 are the same as those described above with reference to FIGS. 2 through 7, and thus will not be described in detail at this time.

Figure 11:
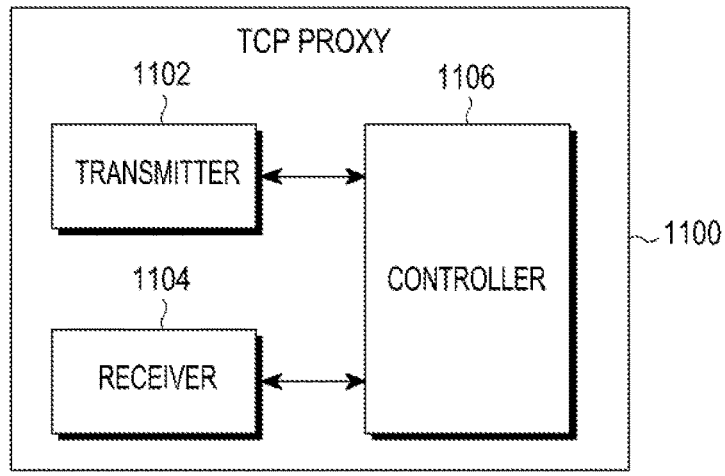
FIG. 11 is a block diagram of an internal structure of a TCP proxy, which is related to initial window value determination, in an LTE communication system according to an embodiment of the present disclosure.

FIG. 11 is a block diagram of an internal structure of a TCP proxy, which is related to initial window value determination, in an LTE communication system according to an embodiment of the present disclosure.

Referring to FIG. 11, a TCP proxy 1100 may include a transmitter 1102, a receiver 1104, and a controller 1106.

The controller 1106 controls an overall operation of the TCP proxy 1100. In particular, the controller 1106 controls an overall operation related to determination of an initial window value according to an embodiment of the present disclosure. Herein, the overall operations related to resource management are the same as those described above with reference to FIGS. 2 through 5, and 7, and thus will not be described in detail at this time.

The transmitter 1102 transmits various messages under control of the controller 1106. Herein, various messages transmitted by the transmitter 1102 are the same as those described above with reference to FIGS. 2 through 5, and 7, and thus will not be described in detail at this time.

The receiver 1104 receives various messages under control of the controller 1106. Herein, various messages received by the receiver 1104 are the same as those described above with reference to FIGS. 2 through 5, and 7, and thus will not be described in detail at this time.

Figure 12:
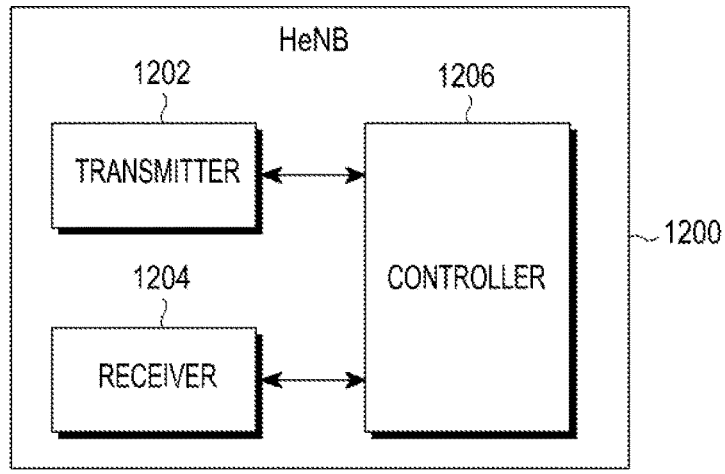
FIG. 12 is a block diagram of an internal structure of a home eNB (HeNB), which is related to initial window value determination, in an LTE communication system according to an embodiment of the present disclosure.

FIG. 12 is a block diagram of an internal structure of an HeNB, which is related to initial window value determination, in an LTE communication system according to an embodiment of the present disclosure.

Referring to FIG. 12, an HeNB 1200 may include a transmitter 1202, a receiver 1204, and a controller 1206.

The controller 1206 controls an overall operation of the HeNB 1200. In particular, the controller 1206 controls an overall operation related to determination of an initial window value according to an embodiment of the present disclosure. Herein, the overall operations related to resource management are the same as those described above with reference to FIGS. 8 and 9, and thus will not be described in detail at this time.

The transmitter 1202 transmits various messages under control of the controller 1206. Herein, various messages transmitted by the transmitter 1202 are the same as those described above with reference to FIGS. 8 and 9, and thus will not be described in detail at this time.

The receiver 1204 receives various messages under control of the controller 1206. Herein, various messages received by the receiver 1204 are the same as those described above with reference to FIGS. 8 and 9, and thus will not be described in detail at this time.

Particular aspects of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, whether or not erasable or re-recordable, in a volatile or non-volatile storage such as a read-only memory (ROM), a memory such as a random access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the appa-

The invention claimed is:

1. A proxy server m a wireless communication system, the proxy comprising:
   a transceiver; and
   a processor configured to:
      establish a transmission control protocol (TCP) connection between a user equipment (UE) and the proxy server,
      receive a message comprising a cell ID for identifying a serving cell of the UE, a modulation and coding rate scheme (MCS) allocated to the UE and information related to a TCP flow between the UE and the proxy server from the UE,
      identify a UE group based on the received message, the UE group having a plurality of UEs with both the cell ID and the MCS included in the received message, and
      determine an initial window value for the TCP connection based on a round trip time (RTT) value and a throughput value corresponding to the identified UE group.

2. The proxy server of claim 1, wherein the initial window value is determined as a product of the throughput value and the RTT value.

3. The proxy server of claim 1, wherein the initial window value is determined as a sum of a first value that is a product the throughput value and the RU value and a second value that is a product of a previously stored throughput value and a previously stored RU value at a predetermined ratio.

4. The proxy server of claim 1, wherein the processor is further configured to:
   establish a second TCP connection between a UE and the proxy server through a wireless local area network (WLAN) access point (AP),
   receive a message comprising supportable bandwidth information and basic service set (BSS) load information related to the second TCP connection from the UE, and
   determine an initial window value for the second TCP connection based on the supportable bandwidth information and the BSS load information.

5. The proxy server of claim 1,
   wherein the processor further configured to manage a first TCP flow for RU measurement and a second TCP flow for throughput measurement based on at least one of a flow duration and an application type, and
   wherein the RU value is measured on the first TCP flow for the RU measurement, and the throughput value is measured on the second TCP flow for the throughput measurement.

6. The proxy server of claim 1, wherein the RTT value and the throughput value are updated whenever uplink (UL) data is received, or at predetermined time intervals, or a new TCP session set-up, and are stored based on at least one of a date, time, or an occurrence of a particular event.

7. The proxy server of claim 1, wherein the message further comprises at least one of location information indicating a UE's location in a cell or mobility information indicating a moving speed of the UE.

8. A method for setting an initial window value at a proxy server in a wireless communication system, the method comprising:
   establishing a transmission control protocol (TCP) connection between a user equipment (UE) and the proxy server;
   receiving a message comprising a cell ID for identifying a serving cell of the UE, a modulation and coding rate scheme (MCS) allocated to the UE and information related to a TCP flow between the UE and the proxy server from the UE;
   identifying a UE group based on the received message, the UE group having a plurality of UEs with both the cell ID and the MCS included in the received message; and
   determining the initial window value for the TCP connection based on a round trip time (RTT) value and a throughput value corresponding to the identified UE group.

9. The method of claim 8, wherein the initial window value is determined as a product of the throughput value and the RTT value.

10. The method of claim 8, wherein the initial window value is determined as a sum of a first value that is a product the throughput value and the RU value and a second value that is a product of a previously stored throughput value and a previously stored RTT value at a predetermined ratio.

11. The method of claim 8, further comprising:
   establishing a second TCP connection between a UE and the proxy server through a wireless local area network (WLAN) access point (AP);
   receiving a message comprising supportable bandwidth information and basic service set (BSS) load information related to the second TCP connection from the UE; and
   determine an initial window value for the second TCP connection based on the supportable bandwidth information and the BSS load information.

12. The method of claim 8, further comprising:
   managing a first TCP flow for RTT measurement and a second TCP flow for throughput measurement based on at least one of a flow duration and an application type,
   wherein the RTT value is measured on the TCP flow for the RTT measurement, and the throughput value is measured on the TCP flow for the throughput measurement.

13. The method of claim 8, wherein the RTT value and the throughput value are updated whenever uplink (UL) data is received, or at predetermined time intervals, or a new TCP session set-up, and are stored based on at least one of a date, time, or an occurrence of a particular event.

14. The method of claim 8, wherein the message further comprises at least one of location information indicating a UE's location in a cell or mobility information indicating a moving speed of the UE.

* * * * *